(12) United States Patent
Höhn et al.

(10) Patent No.: US 8,291,645 B2
(45) Date of Patent: Oct. 23, 2012

(54) METHOD AND DEVICE FOR ADJUSTING A FRAMELESS WINDOW PANE OF A MOTOR VEHICLE

(75) Inventors: Alexander Höhn, Coburg (DE); Felix Heckmann, Engen (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 1439 days.

(21) Appl. No.: 11/743,606

(22) Filed: May 2, 2007

(65) Prior Publication Data
US 2009/0007493 A1 Jan. 8, 2009

(30) Foreign Application Priority Data
May 11, 2006 (DE) .......................... 10 2006 023 330

(51) Int. Cl.
*E06B 3/00* (2006.01)
(52) U.S. Cl. ............................................ 49/506; 49/348
(58) Field of Classification Search ............ 49/506, 49/31, 348, 349; 296/146.2, 146.16; 318/264, 318/265, 266, 272, 282, 286, 466, 467, 468
See application file for complete search history.

(56) References Cited

U.S. PATENT DOCUMENTS

| | | | | |
|---|---|---|---|---|
| 3,844,064 A * | 10/1974 | Yamaha et al. | ................... | 49/348 |
| 4,730,414 A * | 3/1988 | Nakamura et al. | ............... | 49/348 |
| 4,823,507 A * | 4/1989 | Miller | ............................. | 49/227 |
| 5,374,098 A * | 12/1994 | Nelson | ........................ | 296/180.1 |
| 5,489,104 A * | 2/1996 | Wolff | .............................. | 277/646 |
| 5,955,854 A * | 9/1999 | Zhang et al. | ................... | 318/480 |
| 5,982,124 A * | 11/1999 | Wang | .............................. | 318/466 |
| 6,729,683 B2 * | 5/2004 | Kreiner et al. | ................ | 296/223 |
| 7,489,095 B2 * | 2/2009 | Pebre | ............................. | 318/280 |
| 2002/0143452 A1 * | 10/2002 | Losey | ............................. | 701/49 |
| 2003/0116994 A1 * | 6/2003 | Richtor et al. | ............ | 296/146.16 |
| 2005/0229497 A1 * | 10/2005 | Eichin | ............................. | 49/506 |

FOREIGN PATENT DOCUMENTS

| | | |
|---|---|---|
| DE | 196 28 203 C2 | 1/1998 |
| DE | 101 49 578 A1 | 4/2003 |
| DE | 10 2004 011 015 A1 | 9/2005 |
| DE | 10 2004 021 021 A1 | 11/2005 |

* cited by examiner

*Primary Examiner* — Katherine W Mitchell
*Assistant Examiner* — Catherine A Kelly
(74) *Attorney, Agent, or Firm* — Christie, Parker & Hale, LLP

(57) ABSTRACT

In a method and a device for adjusting a frameless window pane of a motor vehicle by means of a motorized window lifter activated by a control device, for adjusting the window pane between an open position and a closed position, in which the window pane upper edge is arranged in a window pane seal associated therewith and connected to the motor vehicle roof, the closed position of the window pane and/or the closing force with which the window pane bears against the window pane seal, is altered depending on the relative position of the window pane seal to the window pane upper edge. As a result, a connection of the window pane upper edge to the window pane seal which remains the same irrespective of the driving speed of the motor vehicle, is guaranteed and ensures that even at higher driving speeds there is no occurrence of leakages or increased wind noise.

13 Claims, 2 Drawing Sheets

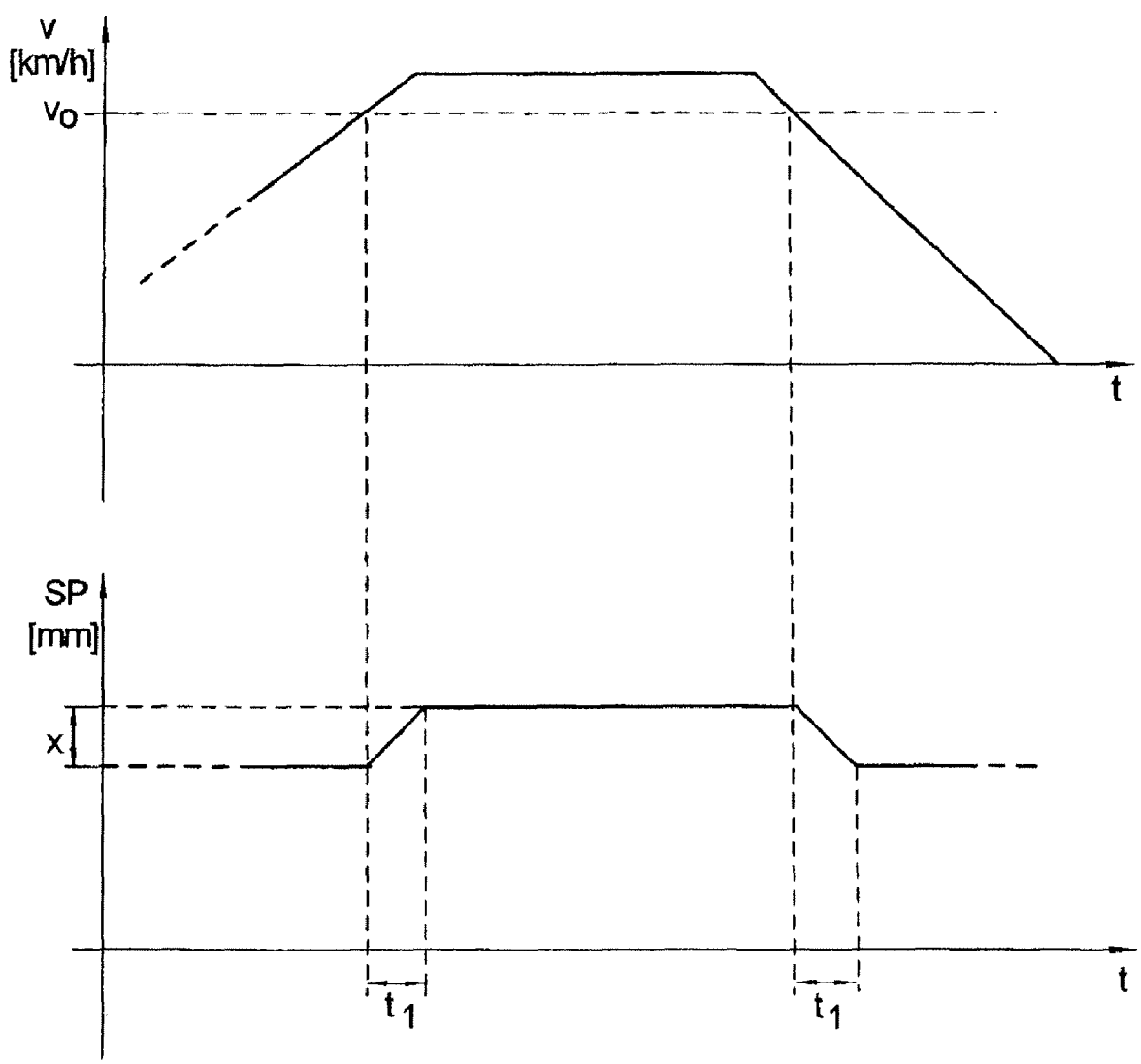

METHOD AND DEVICE FOR ADJUSTING A FRAMELESS WINDOW PANE OF A MOTOR VEHICLE

CROSS-REFERENCE TO RELATED APPLICATION

This application claims priority of German Patent Application Number 10 2006 023 330.1, filed on May 11, 2006.

BACKGROUND

The invention relates to a method and a device for adjusting a frameless window pane of a motor vehicle.

Frameless window panes are used in, amongst others, convertibles and coupés, i.e. in motor vehicles without B-pillars. In contrast to window panes of other motor vehicles, they are not guided on a door frame with at least one lateral window pane seal and with the window pane upper edge received in an upper window pane seal when the window pane is closed, but guided in a guide device of the window lifter for raising and lowering the window pane and when the window pane is closed, received with their window pane upper edge by an upper window pane seal connected to the bodywork roof of the motor vehicle. As a result, on the one hand, the window pane is connected to the window lifter arranged in the door shaft of a motor vehicle door and, on the other hand, when the window pane is closed, the window pane is connected to the motor vehicle roof, i.e. it links two different parts of the motor vehicle bodywork in the closed state.

In this connection, in convertibles, i.e. in motor vehicles with a flexible bodywork roof, the problem arises that at higher speeds the motor vehicle roof is raised due to aerodynamic forces. By raising the flexible motor vehicle roof, the window pane seal is removed from the window pane upper edge, so that leakages are created and offending wind noise occurs.

The same problem, although to a lesser extent, however, also occurs with coupes or convertibles with a hardtop or a foldable metal roof, as at increased driving speed additional forces in the direction of the Y axis act on the window pane due to the low air pressure on the exterior of the motor vehicle bodywork which occurs as a result of aerodynamic flow, which in the region of the window pane upper edge at greater driving speeds of the motor vehicle also lead to leakages and wind noise.

SUMMARY

It is the object of the present invention to connect the window pane upper edge of a frameless window pane of a motor vehicle in its upper end position to the window pane seal, in a manner which substantially remains the same, irrespective of the driving speed of the motor vehicle.

An exemplary solution according to an exemplary embodiment of the invention ensures a connection of the window pane upper edge of a frameless window pane of a motor vehicle in its upper end position to the window pane seal, which substantially remains the same, irrespective of the driving speed of the motor vehicle.

An exemplary solution according to an exemplary embodiment of the invention is suitable for motor vehicles without B-pillars, i.e. both for convertibles with a flexible fabric roof, foldable metal roof or hardtop or for coupes, and ensures that even at higher driving speeds, there is no occurrence of leakages in the region of the window pane upper edge or increased wind noise and ensures, therefore, an increase in quality for motor vehicles without B-pillars.

Detecting the relative position between the window pane and the window pane seal may be carried out by detecting the position of the window pane seal and/or aligning the window pane with the window pane seal, which is supplied as an actual value to the control device for activating the window lifter.

For detecting the relative position between the window pane and the window pane seal, optoelectronic systems, capacitive or inductive systems or the like may be used, by means of which, for example, the alteration of a gap between the upper edge of the window pane and the window pane seal is detected on capacitive, inductive or optoelectronic paths. Further detection systems which may be particularly advantageously converted in practice, are provided hereinafter.

The detection of the position of the window pane seal is suitable, in particular, for convertibles with a flexible fabric roof, which due to aerodynamic forces are raised at higher speeds, whilst the detection of the alignment of the window pane to the window pane seal is suitable for convertibles with a foldable metal roof or hardtop as well as for coupes, in which the window pane upper edge, due to aerodynamic forces and with no lateral window pane guide, is forced away toward the outside, i.e. away from the interior of the motor vehicle.

In one exemplary embodiment alternatively or additionally, the closing force with which the window pane presses against the window pane seal may be detected and supplied as an actual value to the control device for activating the window lifter for raising and lowering the window pane.

This exemplary solution is suitable, in particular, for convertibles with a flexible fabric roof, as when a fabric roof is raised as a result of aerodynamic forces, the closing force is reduced. With convertibles and coupes, with a fixed vehicle roof, an alteration of the relative position between the window pane seal and the window pane upper edge also leads to an alteration of the closing force, with a changing alignment of the window pane relative to the window pane seal, due to aerodynamic forces, so that even in this case conclusions may be drawn from the alteration of the closing force of the window pane about an alteration of the position of the window pane seal and/or the alignment of the window pane relative to the window pane seal.

Preferably, or as a complement to the aforementioned actual value detection, the driving speed of the motor vehicle is detected and supplied as an actual value to the control device of the window lifter raising and lowering the window pane. By means of the known interaction between the driving speed of a motor vehicle and the effect of aerodynamic forces on the window pane and/or on a flexible fabric roof of a convertible, conclusions may be drawn from the driving speed of the motor vehicle about the position of the window pane seal and/or the alignment of the window pane on the window pane seal. As the driving speed of a motor vehicle is detected in any case for the speedometer as well as for a plurality of other control and regulating processes in the motor vehicle, this results in the possibility of drawing conclusions from the driving speed about the connection of the window pane upper edge to the window pane seal without increased detection costs.

Preferably the closed position and/or closing force of the window pane is raised at increasing driving speed, and [lacuna] at reducing driving speed, in particular starting from a predetermined position and/or closing force at a predetermined driving speed, is raised at increasing driving speed and is lowered at reducing driving speed.

This exemplary embodiment of the solution according to the invention makes it possible in motor vehicles, the window lifters thereof being controlled via electronics, which use a CAN-bus or an appropriate data connection, to transmit a signal corresponding to the vehicle speed to the electronics via this data connection, so that it is not necessary to proceed with additional installation costs.

The alteration of the closed position and/or closing force of the window pane with an alteration of the relative position between the window pane upper edge and the window pane seal may be path-controlled over a predeterminable distance, by a predeterminable amount of closing force, in a time-controlled manner over a predeterminable timespan or may take place by means of a family of characteristics, in which the closed position and/or closing force of the window pane is stored depending on the driving speed and/or the relative position between the window pane upper edge and the window pane seal.

In order to prevent the driver of a motor vehicle from being distracted when the window lifter and/or the window pane apparently moves arbitrarily during the journey, without a corresponding input command by the driver, according to a further feature of the method according to the invention, it is provided to alter the closed position of the window pane with minimal adjustment speed, in particular with an adjustment speed which is imperceptible.

Additionally or alternatively, the alteration of the closed position of the window pane may be linked to a switching device to be actuated by the driver of the motor vehicle, in order to eliminate the distraction of the driver by an apparently arbitrary alteration of the window pane position.

The method according to the invention may be advantageously associated with an anti-jamming control, by the closed position of the window pane being set and/or altered in a force-controlled manner by predetermining an adjusting force, the adjusting force preferably being the same as the sum of a force required to adjust the window pane and an excess force which may be altered and in the window pane seal region the adjustment of the window pane is halted at a predeterminable threshold value of the adjusting force or the excess force.

The linking of the method according to the invention with an anti-jamming control, in particular an anti-jamming control with excess force limitation, makes it possible to use detection elements which are present for the anti-jamming control, and to use the same control algorithms as are present in the anti-jamming control for regulating the closing force of the window pane.

Moreover, the closed position and/or the closing force of the window pane may be altered in an adaptive manner by an alteration of the closed position and/or the closing force, for example as a connection between the driving speed of the motor vehicle and a set closed position being learned.

A further possibility for regulating the closed position is that the closed position and/or the closing force of the window pane is output as an output value of an output neuron of a neural network, which contains a plurality of input neurons of an input layer, to which at least one actual value of the driving speed, the closing force, adjusting force and/or the excess force, as well as at least one buried layer comprising neurons is applied.

The use of a calculation unit with the application of this principle of a neural network makes it possible to take into account the different influencing variables on the closed position and/or closing force of a window pane, to adapt automatically to an alteration of these influencing variables and to ensure a high degree of flexibility when taking into account the influencing variables on the closed position and/or the closing force of the window pane. In this case, the capacity of a neural network is used to learn from given data, in an autonomous manner, without it having to be explicitly programmed therefor and also to identify stored patterns, even when the input pattern in a learning phase is incomplete or partially faulty or when conclusions are intended to be drawn from learned problems about unlearned problems.

A device according to an exemplary embodiment of the invention for adjusting a frameless window pane of a motor vehicle by means of a motorized window lifter activated by a control device for adjusting the window pane between an open position and a closed position, in which the window pane upper edge is arranged in a window pane seal associated therewith and connected to the motor vehicle roof, is characterized in that the control device comprises control electronics for altering the closed position of the window pane and/or the closing force with which the window pane bears against the window pane seal, depending on the relative position of the window pane seal to the window pane upper edge.

The device according to an exemplary embodiment of the invention ensures a connection of the window pane upper edge of a frameless window pane of a motor vehicle in its upper end position to the window pane seal, which substantially remains the same, irrespective of the driving speed of the motor vehicle, and ensures that, even at higher driving speeds, there is no occurrence of leakages in the region of the window pane upper edge or increased wind noise which, for motor vehicles without B-pillars, i.e. both for convertibles with a flexible fabric roof, foldable metal roof or hardtop or for coupés is associated with a substantial increase in quality.

Preferably, the control electronics are connected to at least one actual value sensor for detecting a value representing the relative position of the window pane seal to the window pane and to a setpoint sensor determining the closed position and/or the closing force of the window pane depending on the relative position of the window pane seal to the window pane, the control device comprising an interface for at least one actual value sensor.

One exemplary embodiment of the device according to an exemplary embodiment of the invention is characterized in that the interface is configured for transmitting a speed signal dependent on the driving speed of the motor vehicle.

Alternatively or additionally, a closing force signal dependent on the closing force of the window pane may be transmitted via the interface.

The interface may be configured to be line-bound and/or wired or consist of a data bus and/or control bus, in particular a CAN-bus (Controller Area Network) or LIN-bus (Local Interconnect Network). In this case, a door control device may be used which activates the window lifter of the relevant door. With such a control system the door control device for the front doors may obtain its signals via a CAN-bus and then automatically activate the window lifter of the rear doors via a separate bus, for example via a LIN-bus.

One exemplary embodiment of the interface consists of a radio transmission interface.

Although a possible distraction of the driver of a motor vehicle as a result of an alteration of the pane position, in particular at higher driving speeds, at which increased engine noise and driving noise occurs, may be classified as completely acceptable, according to a further feature of the invention a distraction of the driver of a motor vehicle by an apparently arbitrary alteration of the window pane position may be eliminated by a switching device which may be actuated by the driver of the motor vehicle being provided for triggering an alteration of the closed position of the window pane depending on the relative position of the window pane seal to the window pane upper edge.

BRIEF DESCRIPTION OF THE DRAWINGS

With reference to one of the embodiments shown in the drawings, the subject of the invention and the idea underlying the invention are to be described in more detail, in which drawings:

FIG. 2 shows a representation of the driving speed of the motor vehicle and the closed position of the frameless window pane over a period of time.

DETAILED DESCRIPTION

Figure 1:
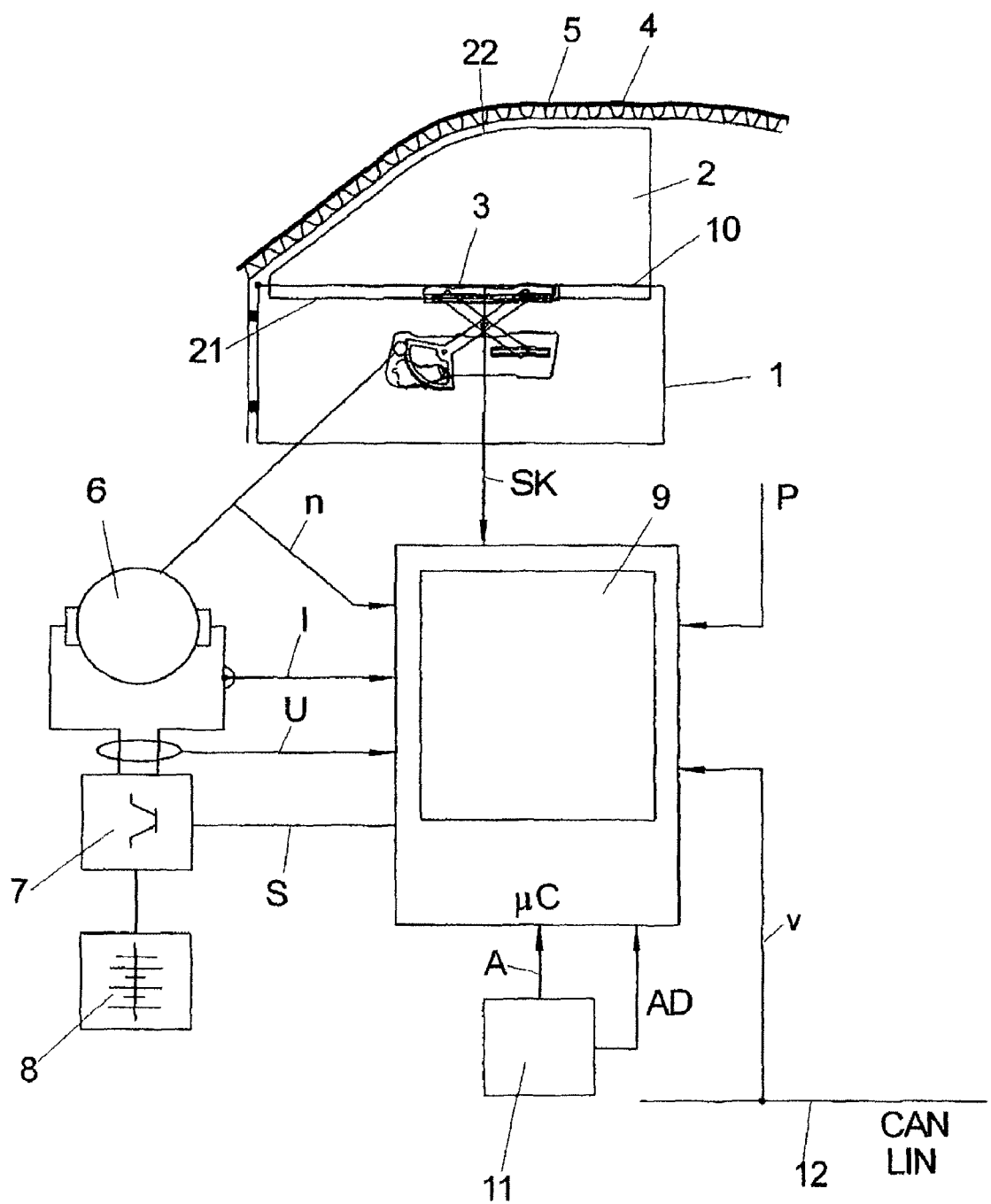
FIG. 1 shows a schematic representation of a device for adjusting a frameless window pane of a motor vehicle with a window lifter, a drive device and a control device.

The system shown schematically in FIG. 1 for adjusting a frameless window pane 2 in a motor vehicle door 1 with a door armrest 10 comprises a lifting rail of a window lifter 3 which borders the lower edge 21 of the window pane 2, which window lifter is attached to a drive motor 6 for raising and lowering the window pane 2. The drive motor 6 is powered via an electronic switching device 7 by a voltage source 8, for example a motor vehicle battery, which determines both the speed and the rotational direction of the drive motor 6.

A two-arm window lifter or crossed-arm window lifter is shown symbolically in FIG. 1 as a window lifter 3. The invention is, however, naturally also able to be applied to other types of window lifters, such as single-strand or dual-strand cable or Bowden cable window lifters, path controlled window lifters, toothed rack window lifters or the like.

Control and regulating electronics 9 in the form of a microcomputer supply the electronic switching device 7 with control and regulating signals S and are connected to an operating unit 11, for example with buttons or switches for operating the window lifter system. They contain, in addition to a processor, one or more storage devices as well as input and output modules.

The schematic representation of FIG. 1 shows the window pane 2 in an almost completely raised state in which the window pane upper edge 22 is positioned just before entering a window pane seal 5 connected to a flexible motor vehicle roof 4. When the window pane 2 is fully raised, the window pane upper edge 22 is located inside the window pane seal 5, so that a moisture-tight terminal portion is formed and no gap remains between the window pane upper edge 22 and the window pane seal 5, which during the driving operation could cause offending wind noise.

At higher driving speeds of the motor vehicle, the flexible motor vehicle roof 4 is raised due to aerodynamic forces, from a specific driving speed $v_0$, the window pane seal 5 being at least partially removed, to such an extent from the window pane upper edge 22 that a moisture-tight terminal portion is no longer guaranteed, and a gap is formed which leads to a high degree of wind noise in the passenger compartment of the motor vehicle.

Further input signals, in addition to the control signals A, output by the operating unit 11, are applied to the control and regulating electronics 9 on the input side, in the schematic representation of FIG. 1 a plurality of possible input signals being shown. Thus in the schematic representation of FIG. 1 the drive motor voltage U, the drive motor current I as well as the speed n of the drive motor 6 are supplied to the control and regulating electronics 9. Moreover, an actual value proportional to the current closing force or adjusting force SK which corresponds to the respective adjusting force with which the window pane 2 is moved, and/or the closing force SK with which the window pane 2 is inserted into the window pane seal 5 and bears against the flexible motor vehicle roof 4 is applied to the control and regulating electronics 9.

Moreover, a position signal P providing the position of the window pane seal 5 and/or the flexible motor vehicle roof 4 relative to the window pane upper edge 22 of the fully raised window pane, may be supplied to the control and regulating electronics 9.

The control and regulating electronics 9 obtain an input signal corresponding to the driving speed v of the motor vehicle as a further input signal and, to this end, is connected to an internal vehicle digital bus system 12, which preferably is a so-called CAN (Controller Area Network) bus, via which data is transmitted in series on a two-core cable. Alternatively a LIN-bus may be provided.

Additionally, a direct trigger signal AD may be applied to the control and regulating electronics 9 which, for example, is output by the operating unit 11 which is operated by the driver of the motor vehicle.

In FIG. 1, a plurality of possible input signals are shown of which, however, one portion is excluded and/or is able to be replaced by other input signals. For example, a specific detection of the closing and adjusting force SK of the window pane 2 is dispensed with and instead conclusions are drawn from the detection of the drive motor current I about the respective adjusting force with which the window pane 2 is moved or about the closing force with which the window pane 2 presses against the window pane seal 5.

A detection of the respective position of the window pane upper edge 22 may be detected via a corresponding position sensor or by evaluating the revolutions of the drive motor 6.

FIG. 2 shows in a temporal representation the path of the speed v of the motor vehicle as well as the closed position SP of the window pane 2, for example with reference to the window pane seal 5 connected to the flexible motor vehicle roof 4, or as a measurement of the raising of the window pane 2 by means of the window lifter 3. Under the assumption that, up to a driving speed $v_0$ of for example 150 km/h, the flexible motor vehicle roof 4 is not raised to a significant extent, so that the window pane seal 5 is removed to such an extent from the window pane upper edge 22, that a gap is produced between the window pane upper edge 22 and the window pane seal 5, the closed position of the window pane 2 is determined by the predetermined position of the window pane seal 5 when the motor vehicle is stationary. If the driving speed v of the motor vehicle exceeds the predetermined driving speed $v_0$ of, for example, 150 km/h, the window pane 2 is raised by an amount x, so that the raising of the flexible motor vehicle roof 4 caused by the aerodynamic forces and thus the removal of the window pane seal 5 from the window pane upper edge 22 is compensated for. If the driving speed v of the motor vehicle again drops below the predetermined driving speed $v_0$ of, for example 150 km/h, the window pane 2 is again lowered by the amount x, as with the diminishing aerodynamic forces the motor vehicle roof 4 and the window pane seal 5 connected to the motor vehicle roof 4 again return to their original position.

As an alternative to the aforementioned adjustment of the window pane 2, when exceeding and falling below a specific predetermined driving speed of the motor vehicle, the raising and lowering of the window pane 2 may be carried out at different driving speeds. Thus, for example, the raising of the window pane 2 as in the aforementioned embodiment may be initiated at a driving speed $v_0$ of >150 km/h, whilst the window pane 2 is only lowered when reaching a driving speed of, for example, 140 km/h, in order to ensure sufficient contact of the window pane upper edge 22 with the window pane seal 5.

Instead of raising or lowering the window pane 2 by a predeterminable amount x, the window lifter 3 may be actuated over a predeterminable timespan $t_1$, when the driving speed v of the motor vehicle exceeds the predetermined driving speed $v_0$ and/or falls below the predetermined driving speed $v_0$.

Instead of linking the adjustment of the frameless window pane 2 to the driving speed v of the motor vehicle, the adjustment of the window pane 2 may be linked to an alteration of the actual values of other parameters. Thus, for example by means of a corresponding sensor, the respective position of the flexible motor vehicle roof 4 and thus the window pane seal 5 connected to the flexible motor vehicle roof 4 may be detected and supplied as an input signal P to the control and regulating electronics 9. A corresponding sensor for detecting the position of the motor vehicle roof 4 may consist of an optoelectronic sensor which is aligned with the lower edge of the window pane seal 5 in the region of the frameless window pane 2, a voltage sensor, by means of which the tensile stress acting on the flexible motor vehicle roof 4 due to the aerodynamic forces is detected and the like.

The detection of the closing force SK may be carried out directly on the window lifter 3 and/or on the connection of the lifting rail of the window lifter 3 to the window pane lower edge 21, for example by means of a piezo element.

The processing of the actual values supplied to the control and regulating electronics 9 may be carried out in the conventional manner by means of a PI regulator by the application of additional disturbance variables or by means of a comparator configured as a window discriminator, to which the driving speed v of the motor vehicle is applied as a first comparative signal and to the other input thereof a comparative value corresponding to the predetermined speed $v_0$ is applied and which, when the comparative value is exceeded, outputs an output signal to the switching device 7, which adjusts the drive motor 6 in the raising or lowering direction for raising or lowering the window pane 22 by the predetermined amount x and/or activates the drive motor 6 over the predetermined timespan $t_1$ in the one or the other direction.

A further alternative to the configuration of the control and regulating electronics 9 consists of the use of a neural network, to which different input variables such as, for example, the drive motor current I, the drive motor voltage U, the speed n of the drive motor 6 and the driving speed v are supplied and which comprises a plurality of neurons arranged in an input layer for receiving the input signals, in one or more buried layers and an output layer for outputting the control signal S and weighted connections with the structure of a directed graph. The neural network is able to learn by variable weighting of the inputs of the individual neurons and thus is able to be adapted to altered conditions.

The application of a neural network in a method for monitoring the adjusting movement of a window pane in a motor vehicle is, for example, disclosed in DE 10 2004 011 015 A.

Also, when using other electronic modules in the control and regulating electronics 9, an adaptive alteration of the closed position and/or the closing force of the window pane 2 may be provided, in particular the connections between the driving speed of the motor vehicle and the set closed position of the window pane 2 being able to be learnt and/or adaptively altered.

The drive unit formed as a drive motor 6 and window lifter 3 may be configured to be self-locking, so that once set, a position of the window pane 2 is mechanically held in a self-locking manner. Alternatively, instead of mechanical self-locking, electronic self-locking may be provided in which the current position of the window pane 2 is maintained by means of the drive motor 6, by the drive motor 6 being activated, for example on rough stretches of road with corresponding rattling phenomena on the window pane 2, in order to compensate for actual value shifts of the window pane 2. By a corresponding setpoint adjustment, this electronic self-locking may compensate for the alteration of the relative position between the window pane upper edge 22 and the window pane seal 5 caused by an alteration of the position of the window pane seal 5, by an alteration of the set position during the adjustment of the raising of the window pane.

The invention claimed is:

1. A method of moving a frameless window pane of a motor vehicle using a motorized window lifter activated by a control device, the method moving the window pane between an open position and a closed position in which an upper edge of the window pane is arranged in contact with a window pane seal which is associated therewith, the window pane seal being connected to a roof of the motor vehicle, the method comprising:
    altering, when the window pane is in said closed position, a closing force with which the window pane bears against the window pane seal while the window pane is still in the closed position, in dependence on the relative position of the window pane seal to the window pane upper edge;
    wherein a driving speed of the motor vehicle is detected and supplied to the control device; and
    wherein the closing force of the window pane is raised at a first predetermined driving speed of the motor vehicle and is lowered at a second predetermined driving speed of the motor vehicle, the second predetermined speed being lower than the first predetermined speed.

2. The method according to claim 1, wherein either or both of the position of the window pane seal or an alignment of the window pane to the window pane seal is detected and supplied as an actual value to the control device.

3. The method according to claim 1, wherein the closing force with which the window pane presses against the window pane seal is detected and supplied as an actual value to the control device.

4. The method according to claim 1, wherein a driving speed of the motor vehicle is detected and supplied as an actual value to the control device.

5. The method according to claim 1, wherein either or both of the closed position of the window pane is altered by a predeterminable distance or the closing force of the window pane is altered by a predetermined amount of closing force, during an alteration of the relative position of the window pane seal to the window pane.

6. The method according to claim 1, wherein the closing force of the window pane is altered in a time-controlled manner over a predeterminable timespan with an alteration of the relative position of the window pane seal to the window pane.

7. The method according to claim 1, wherein the closing force of the window pane is altered with reference to a family of characteristics, in which at least one of the closed position and the closing force of the window pane is stored, depending on either or both of the driving speed or the relative position of the window pane seal to the window pane.

8. The method according to claim 1, wherein the closing force is altered depending on the driving speed of the motor vehicle.

9. The method according to claim 1, wherein the alteration of the closing force is initiated by a switching device configured to be actuated by a driver of the motor vehicle.

10. The method according to claim 1, wherein the closing force of the window pane is altered in an adaptive manner.

11. The method according to claim 1, wherein the adjusting force is a sum of a force required to adjust the window pane and an alterable excess force, wherein in a region of the window pane seal the adjustment of the window pane is halted at a predeterminable threshold value of the adjusting force or the excess force.

12. The method according to claim 11, wherein the closing force of the window pane is output as an output value of an output neuron of a neural network having a plurality of input neurons of an input layer, to which at least one actual value of a driving speed, the closing force, the adjusting force and the excess force, as well as at least one buried layer comprising neurons is applied.

13. A method of moving a frameless window pane of a motor vehicle using a motorized window lifter activated by a control device, the method moving the window pane between an open position and a closed position in which an upper edge of the window pane is arranged in contact with a window pane seal associated therewith, the window pane seal being connected to a roof of the motor vehicle, the method comprising:
   altering, when the window pane is in said closed position, a closing force with which the window pane bears against the window pane seal, in dependence on the relative position of the window pane seal to the window pane upper edge;
   wherein a driving speed of the motor vehicle is detected and supplied to the control device; and
   wherein the closing force of the window pane, starting from a closing force at a predetermined driving speed of the motor vehicle, is raised when the detected speed of the motor vehicle is above the predetermined speed of the motor vehicle and is lowered when the detected speed of the motor vehicle is below the predetermined speed of the motor vehicle.

* * * * *